Patented Sept. 6, 1938

2,129,478

UNITED STATES PATENT OFFICE 2,129,478

POLYMERIZATION PROCESS

Otto Röhm, Darmstadt, Germany, assignor to Röhm & Haas Company, Philadelphia, Pa.

No Drawing. Application December 12, 1934, Serial No. 757,171. In Germany December 2, 1933

6 Claims. (Cl. 260—2)

This invention relates to the manufacture of polymerization products comprising esters of acrylic and methacrylic acids, either when polymerized alone or in admixture with each other, or with derivatives of these acids, or with other polymerizable substances as vinyl acetate, styrene, butadiene, etc. It relates more specifically to a method of effecting the polymerization whereby the formation of bubbles in the finished product is avoided and the polymerization reaction itself is less violent than in the case with previously known methods of polymerizing these substances.

The polymerization of esters of acrylic and methacrylic acids and their derivatives by any of the well-known polymerizing agents such as oxygen or oxygen-yielding substances (for example, benzoyl peroxide, hydrogen peroxide, benzoyl acetyl peroxide), heat, light, pressure, etc., almost invariably leads to a violent reaction due to the exothermic nature of the polymerization. This causes distillation of considerable of the monomeric material present at the start of the reaction and, as the polymerization proceeds, causes innumerable bubbles to form which cannot escape or break due to the rapidly increasing viscosity of the mass. This is especially true when the polymerization mixtures contain little or no solvent. The resulting polymerized mass is often so filled with bubbles that it is entirely opaque and unsuitable for the preparation of transparent objects without first dissolving it in a solvent and then removing this solvent by evaporation. Such resins are also incapable of being fused at any temperature sufficiently low not to cause thermo-decomposition (i. e. pyrolysis) In many instances it has thus been impossible in the past to apply the monomeric material and subsequently polymerize in situ to obtain the desired finished article, due to the violence of the reaction and the excessive formation of bubbles.

It is an object of this invention to provide a method whereby the course of the polymerization can be regulated so that bubbles are not formed and the polymerization can be accurately controlled.

It has been found that by the addition of small amounts of rosins, ethereal oils, turpentine oils, etc., the polymerization can be caused to proceed less violently, so that a bubble-free polymerization product can be obtained. This is of particular advantage in cases where it is desired to apply the monomeric material and then polymerize it in situ as, for example, in the manufacture of laminated glass. It is also of advantage where thick slabs, blocks or rods of the polymerized material are to be made, especially when they are intended for use as glass substitutes, for instance as optical lenses, window panes, etc.

The substances which produce the desired and novel effect with which this invention is concerned comprise unsaturated cyclic compounds of the terpene series. More specifically, they include natural balsams and rosins, ethereal oils such as melissa oil, lemon oil, and turpentine substances such as, for example, turpentine oil, terpineols, dipentene, pinenes and pine oils, and mixtures of these substances. Relatively small amounts of these materials are needed to prevent bubble formation. For example, it has been found that as little as 0.5% rosin or 1.0% of turpentine oil (on the basis of the monomeric material) is sufficient. As little as 0.1% rosin will definitely reduce the violence of the reaction.

*Example 1.*—To a mixture of 9.9 parts of methyl acrylate and 0.1 part of turpentine oil is added 0.005 part (0.005% calc. on acrylic ester) of benzoyl peroxide. The solution is heated on an oil bath at 60-65° C. After 1½-2 hours the mixture is noticeably more viscous. Frequently, a gentle distillation of monomer takes place during the early stages of the polymerization. However, in every case the polymerization reaction is extremely mild and in general, is not detectable by any visible evidence. The polymerization is complete after 24-36 hours. Yield: 9.9 parts of a solid, bubble-free polymer.

*Example 2.*—A solution of 9.95 parts ethyl acrylate, 0.05 part rosin and 0.0005 part benzoyl peroxide is heated at 60-65° C. under a reflux condenser. The mixture becomes quite thick after 2 hours and the polymerization proceeds gently and without foaming. After 48 hours the reaction is completed. Yield: 9.85 parts of a bubble-free polymer.

*Example 3.*—Same as Example 1, except that oil of melissa is used in place of turpentine oil. The polymerization proceeds in a manner similar to that described in Example 1 to give a similar product.

*Example 4.*—A solution of 9.9 parts ethyl acrylate, 0.1 part rosemary oil and 0.0005 part benzoyl peroxide is treated as in Example 2. Yield: 9.75 parts of a bubble-free polymer.

*Example 5.*—5.0 parts methyl acrylate, 4.9 parts ethyl acrylate, 0.1 part lemon oil and 0.001 part benzoyl peroxide are heated at 70-75° C.

according to the previous example to give the same results. After 40 hours there is obtained 9.8 parts of a solid, bubble-free polymer.

*Example 6.*—To 9.5 parts of ethyl acrylate are added 0.5 part pine needle oil and 0.005 part benzoyl peroxide. The mixture is heated at 60–65° C. Without noticeable reaction the mixture gradually thickens. After 48 hours, 9.9 parts of a solid, bubble-free polymer is obtained.

*Example 7.*—6.9 parts methyl acrylate, 3.0 parts acrylic nitrile, 0.1 part rosin and 0.075 part benzoyl peroxide are treated as in Example 6 to give 9.85 parts of a bubble-free polymer.

*Example 8.*—9.925 parts methyl acrylate, 0.075 part terpinol (Schimmel & Co., Miltitz) and 0.002 part benzoyl peroxide are mixed and polymerized at 60–65° C. as previously described to give, after 35 hours, 9.8 parts of a solid, bubble-free polymer.

*Example 9.*—9.95 parts methyl $\alpha$-methacrylate, 0.05 part rosin and 0.005 part benzoyl peroxide are heated at 70–80° C. The solution is quite thick after 2 hours. After 24 hours it is solid; after 48 hours the odor of monomer has disappeared. The polymer is bubble-free.

*Example 10.*—9.90 parts ethyl $\alpha$-methacrylate, 0.10 part rosemary oil and 0.005 part benzoyl peroxide are heated at 80–90° C. The mixture gradually thickens without any other visible evidence of reaction. After 24 hours it is odorless. The polymer is bubble-free.

*Example 11.*—A solution of 5.0 parts methyl $\alpha$-methacrylate, 4.925 parts ethylacrylate, 0.075 part melissa oil and 0.01% benzoyl peroxide are heated a 70–80° C. After 24 hours there is obtained a bubble-free polymer.

*Example 12.*—5.0 parts ethyl $\alpha$-methacrylate, 4.90 parts methylacrylate, 0.10 part lemon oil and 0.005 part benzoyl peroxide are heated at 70–80° C. for 48 hours to give a bubble-free polymer.

*Example 13.*—5.0 parts methyl $\alpha$-methacrylate, 4.95 parts ethyl $\alpha$-methacrylate, 0.05 part rosin and 0.01 part benzoyl peroxide are heated at 70–80° C. After 48 hours a bubble-free polymer is obtained which is free from any odor of monomer.

*Example 14.*—0.40 part of benzoyl peroxide is dissolved in 800 parts methyl $\alpha$-methacrylate and 40 parts turpentine oil. The mixture is placed in a vessel 70 cm. by 90 cm. by 2 cm. and heated for 24 hours at 95°. In this way there is obtained a clear sheet of polymer, 2 cm. thick and entirely free from bubbles.

*Example 15.*—Same as Example 14, except that ethyl $\alpha$-methacrylate is used.

*Example 16.*—190 parts of ethyl acrylate, 10 parts of rosin and 2 parts of benzoyl peroxide were heated on a water bath at 95°+2° C. for 48 hours. The mixture gradually thickened, without bubbling and at the end of the period of heating was a clear yellow, soft, tacky solid, capable of flowing slightly at 25° C.; at 100° C. it flowed readily.

*Example 17.*—100 parts ethyl acrylate, 90 parts n-butyl acrylate, 10 parts rosin, 2.6 parts benzoyl peroxide. Same treatment as Example 16. The polymer was a yellow, soft, tacky semi-solid, flowing slowly at 25° C.

To obtain special effects various kinds of substances can be added to the starting materials or at any time during the reaction and, of course, even to the finished products; for example, softening agents such as esters of phthalic acid, acetin, butyl phosphate, butyl stearate, diethylene glycol monoethylether, and other softening agents. Furthermore, the monomeric products can be employed in the form of a solution, especially when a comparatively small amount of solvent is present, or in the emulsified state with or without the addition of emulsifying agents. Any of the well known solvents can be employed, as well as any of the well known dispersing agents and media, for example, water.

It is understood that the examples are given only by way of illustration and not limitation. The conditions may be varied by one versed in the art without departing from the scope of the invention. In some cases higher and lower temperatures and superatmospheric and subatmospheric pressures can be employed. Esters of acrylic and methacrylic acids, other than those specifically mentioned, can be used in the process, including the higher aliphatic esters such as the propyl, butyl, amyl, etc. and the aromatic esters of these acids such as the benzyl esters. In the mixture with the esters of acrylic and methacrylic acids, there may be employed other polymerizable substances and particularly vinyl compounds. In most cases any of the well known polymerizing influences may be employed.

Polymerized esters of acrylic acid and methacrylic acid and conjoint polymers of mixtures of esters of these acids, including mixtures of other polymerizable compounds, including especially vinyl compounds, find a great many uses in the arts. They can be used as binding agents for general adhesive purposes, such as binding cloth to cloth, metal to metal, glass to glass, glass to metal, cloth to paper, paper to paper, etc. They are especially useful in the making of laminated bodies, including laminated glass. They may be used as bonding agent in the manufacture of abrasive articles.

They have been found to possess value as insulating materials, either for heat insulation or electrical insulation, especially when used in combination with substances such as softening agents, talc, mica, wood flour and paper. They have also been found useful in coating and impregnating textiles and other fabrics and have been found to be of value in coating compositions in general, including use in lacquers for rubber. In solution they make an excellent clear coating for metals and because of their resistance to weathering, chemical attack, etc. they are very valuable for coating storage tanks, gasoline tanks, etc.

The polymerized esters of methacrylic acid, especially methyl methacrylate, are very useful as glass substitutes especially when used for optical lenses and in cases where the transmission of ultra-violet light is a factor.

These materials have found other uses in the arts besides those mentioned above, such as for coatings for concrete, electric light bulbs and gaskets. They serve as a binder for uniting asbestos to other materials. They may also be used as protective coatings on airplane wings and to render fabrics gas-impermeable. This is especially significant in the manufacture of fabric for balloons. They may also be employed in the manufacture of artificial silk. When used with lamp black they can be employed in the manufacture of phonograph records. If the lamp black is excluded, a clear, transparent phonograph record is obtained.

Other uses for these materials are as follows: They may be used in gas masks in place of rubber, as artificial dentures, as substitute for Celluloid, for waterproofing textiles, as binder for pigments for use on textiles, for imparting flexibility to textiles.

It is understood that deviations within the description given above are possible without departing from the spirit of the invention, the scope of which is to be limited only by the following claims.

This application is a continuation-in-part of my co-pending application, Serial No. 755,363, filed Nov. 30, 1934.

What I claim is:

1. The process which comprises polymerizing one or more members of the group consisting of aliphatic esters of acrylic and methacrylic acids in the presence of up to 1% of an unsaturated cyclic compound of the terpene series which is one of the group consisting of rosin, melissa oil, lemon oil, turpentine oil, terpineols, dipentene, pinene and pine oil.

2. The process which comprises polymerizing one or more members of the group consisting of aliphatic esters of acrylic and methacrylic acids in the presence of up to 1% of an unsaturated cyclic compound of the terpene series.

3. The process which comprises polymerizing the ethyl ester of acrylic acid in the presence of up to 1% of an unsaturated cyclic compound of the terpene series.

4. The process which comprises polymerizing the ethyl ester of alpha methacrylic acid, in the presence of up to 1% of an unsaturated cyclic compound of the terpene series.

5. The process which comprises polymerizing the methyl ester of alpha methacrylic acid in the presence of up to 1% of an unsaturated cyclic compound of the terpene series.

6. In a process of producing polymerized products from undissolved aliphatic esters of acrylic acid and methacrylic acid, the improvement which comprises carrying out the polymerization in the presence of up to 1% of an unsaturated cyclic compound of the terpene series.

OTTO RÖHM.